United States Patent
Knob

(10) Patent No.: US 11,085,370 B2
(45) Date of Patent: Aug. 10, 2021

(54) PISTON INTERNAL COMBUSTION ENGINE WITH GENERATOR

(71) Applicant: Vaclav Knob, Prague (CZ)

(72) Inventor: Vaclav Knob, Prague (CZ)

( * ) Notice: Subject to any disclaimer, the term of this patent is extended or adjusted under 35 U.S.C. 154(b) by 0 days.

(21) Appl. No.: 16/697,143

(22) Filed: Nov. 26, 2019

(65) Prior Publication Data

US 2020/0263602 A1  Aug. 20, 2020

(30) Foreign Application Priority Data

Nov. 27, 2018  (CZ) ................... CZ2018-653

(51) Int. Cl.

| F02B 75/06 | (2006.01) |
|---|---|
| F16F 15/26 | (2006.01) |
| F01B 1/10 | (2006.01) |
| F02B 75/22 | (2006.01) |
| F02B 75/32 | (2006.01) |
| F02B 75/02 | (2006.01) |
| F02B 75/18 | (2006.01) |

(52) U.S. Cl.
CPC .......... *F02B 75/065* (2013.01); *F16F 15/265* (2013.01); *B60L 2270/145* (2013.01); *F01B 1/10* (2013.01); *F02B 75/225* (2013.01); *F02B 75/32* (2013.01); *F02B 2075/027* (2013.01); *F02B 2075/1808* (2013.01)

(58) Field of Classification Search
CPC ............ F02B 75/065; F02B 2075/1808; F02B 75/32; F02B 75/225; F02B 2075/027; F16F 15/265; B60L 2270/145; F01B 1/10
See application file for complete search history.

(56) References Cited

U.S. PATENT DOCUMENTS

| 2008/0245321 A1* | 10/2008 | Ishizaka ................ F01M 13/04 123/41.86 |
|---|---|---|
| 2014/0373802 A1* | 12/2014 | Cleeves .................. F01L 7/16 123/188.5 |

FOREIGN PATENT DOCUMENTS

| JP | 2014227909 A | * 12/2014 | |
|---|---|---|---|
| WO | WO-2009078747 A1 | * 6/2009 | ............... F01B 1/08 |
| WO | WO-2016058811 A1 | * 4/2016 | ............... F02B 67/06 |

* cited by examiner

*Primary Examiner* — Jacob M Amick
*Assistant Examiner* — Charles J Brauch
(74) *Attorney, Agent, or Firm* — Krishna Kalidindi

(57) ABSTRACT

A piston internal combustion engine with generator has two cylinders and cylinder heads and pistons with connecting rods and two crankshafts which are connected by gears with a ratio of 1:−1 (with opposite direction of rotation). The first crankshaft with the gear is mounted parallel to the second crankshaft with the second gear in one engine case such, that the gears engage. The first crankshaft is coupled to the first generator rotor and the second crankshaft is coupled to the second generator rotor or the flywheel. The moment of inertia of the first crankshaft assembly with the first gear and the first generator rotor is equal to the moment of inertia of the second crankshaft assembly with the second gear and the second generator rotor or flywheel. The cylinders with the pistons and are positioned perpendicularly to the plane of symmetry between the crankshafts, with the axes of the pair of cylinders lying in a plane with the both pistons being at the top dead center simultaneously.

6 Claims, 3 Drawing Sheets

PISTON INTERNAL COMBUSTION ENGINE WITH GENERATOR

TECHNICAL FIELD

The present invention relates to a piston internal combustion engine in coupling with a generator comprising a two-cylinder engine or engine with multiplication of two cylinders with two crankshafts for recharging accumulators in vehicles or airplanes with minimized vibration during operation, so-called range extender.

BACKGROUND OF THE INVENTION

Piston internal combustion engines of various types are used to drive a generator. Single and multi-cylinder units are used. Virtually every engine can be coupled to a generator, and so internal combustion engines based on engines for driving other devices are generally used. They usually have one crankshaft and drive one generator. These designs, although multi-cylinder and well balanced in terms of inertia forces, have torsional vibration, which is caused by individual firing events in the engine cylinders and the immediate reaction of the engine block. However, the requirements for modern generator drives in particular, range extender type, for example for electric vehicles or electric planes, are specific. Requirements are, for example, simplicity, low number of cylinders, low weight, suitable installation dimensions and minimization of vibration. The idea of using an engine with two-crankshafts or coupling two engines is rare so far. An example is the solution according to DE102014115042A and DE202018105331U. There are also engines with two-crankshafts in these documents. However, the engine is not ideally balanced in terms of inertia forces, because the cylinders are located parallel to each other and the inertia forces of the crank mechanisms cannot be balanced ideally. Without the use of a series of balancing shafts, only the 1st harmonic component of the inertia forces can be balanced. This concept with parallel cylinders is high and unsuitable for aero plane requirements of low installation height. Another example is the solution according to U.S. Pat. No. 4,331,111. The engine is designed to drive alternator and aero plane propeller, which is rather different case but also seeks to reduce vibration. The difference is that the crankshafts rotate to the same side and not to the opposite. Then, in contrast to the claimed solution, the reaction moments of individual engines during ignition in cylinders do not cancel with each other but add up. The alternator and propeller are driven by the crankshafts through the gears, that change direction and speed of revolutions. These gears are heavily loaded and are a potential source of resonances and failures.

SUMMARY OF THE INVENTION

The above-mentioned drawbacks are largely eliminated by a piston internal combustion engine with a generator consisting of two cylinders with cylinder heads and pistons with connecting rods and two crankshafts, or their multiples, which are connected by gears with a ratio of 1:−1, which means with the opposite direction of rotation, according to this solution. The principle is that, the first crankshaft with the gear is mounted parallel to the second crankshaft with the second gear in one engine case, such that the 1:−1 gears are engaged and the first crankshaft is coupled to the first generator rotor and the second crankshaft is coupled to the second generator rotor or flywheel, wherein the moment of inertia of the first crankshaft assembly with the first gear and the first generator rotor corresponds to the moment of inertia of the second crankshaft assembly with the second gear and second generator rotor or flywheel. The cylinders with the pistons are positioned perpendicularly to the plane of symmetry between the crankshafts, with the axes of the pair of cylinders lying in the plane and both pistons being at the top dead center simultaneously.

The balancing of the individual crank mechanisms is done in such a way that the unbalanced rotating masses of the crank mechanism are 100% balanced by balance weights and so the centrifugal forces Fo cancel each other out. The reciprocating masses of the crank mechanisms remain completely unbalanced. The inertia forces Fs from the reciprocating masses cancel each other by the symmetrically opposite movement of the same reciprocating masses of both crank mechanisms in one plane.

The engine can be designed with two-stroke or four-stroke cycle. At four-stroke engine, the working cycle of the opposite cylinders can be shifted by one revolution.

The engine may comprise a plurality of opposed cylinder pairs with symmetrical placement of the pistons and connecting rods relative to the plane of symmetry between the two crankshafts, with the working cycles of the pairs of opposed cylinders being phase shifted.

The piston internal combustion engine with a generator ideally meets the requirements of the modern range extender for electrically powered vehicles and airplanes. It is a simple, inexpensive solution with only two cylinders, which is perfectly balanced in terms of inertia forces and moments. The rotating masses on the crank mechanisms are 100% balanced and the inertia forces from the reciprocating masses are canceling each other due to the symmetrically opposite movement of the same reciprocating masses of the two crank mechanisms.

Due to the fact that the pistons with the connecting rods move in one plane, there is no moment from the acting inertia forces. When replacing the connecting rods with two mass points, the additional inertia moment of the connecting rod must be taken into account. In this case, these connecting rod moments also eliminate each other during symmetrical motion of connecting rods in one plane.

Since the moments of inertia are identical for the both opposite direction rotating shafts, and since these shafts are perfectly synchronized by the gears, all the moments caused by unevenness of the motion of piston engine are also completely eliminated. Therefore, no forces or moments are transmitted to the engine mounts and the whole set is completely neutral. The engine does not suffer any vibrations in the mounts, either at start or stop, or at low speed runs. Thus, in an electrically powered airplane, no vibration is transmitted to the airframe structure even when the engine is started or stopped, and thus no sensitive operation can be affected. For example, filming and photographing. The arrangement of the engine is advantageous for installation, because it is very low and can therefore be positioned, for example, under the floor of a vehicle. Also, in airplanes, the flat design is advantageous for the most common types of internal combustion engine installations. During the simultaneous ignition in both cylinders, the forces transmitted to the crank mechanisms and their accelerations are for both equal, so the gears connecting the crankshafts will be loaded minimally. The most advantageous arrangement is to use two identical generators on both crankshafts and then the gears will have only a synchronizing effect. This arrangement is also advantageous because the two generators are smaller in diameter and do not increase the installation height of the engine. Alternatively, if two generators are used, the possibility of disconnecting one generator electrically in case of its failure may also be solved. If only one generator is used and only the flywheel is on the other shaft, then the gears will also transmit the useful power from the flywheel shaft. Even so, the load applied on the gearing will be very favorable. The advantage is also that the engine can be developed into production relatively quickly and easily using the components of contemporary single-cylinder engines.

BRIEF DESCRIPTION OF THE DRAWINGS

The piston internal combustion engine of the present invention will be described in more detail with reference to the attached drawings.

DETAILED DESCRIPTION OF THE INVENTION

Figure 1:
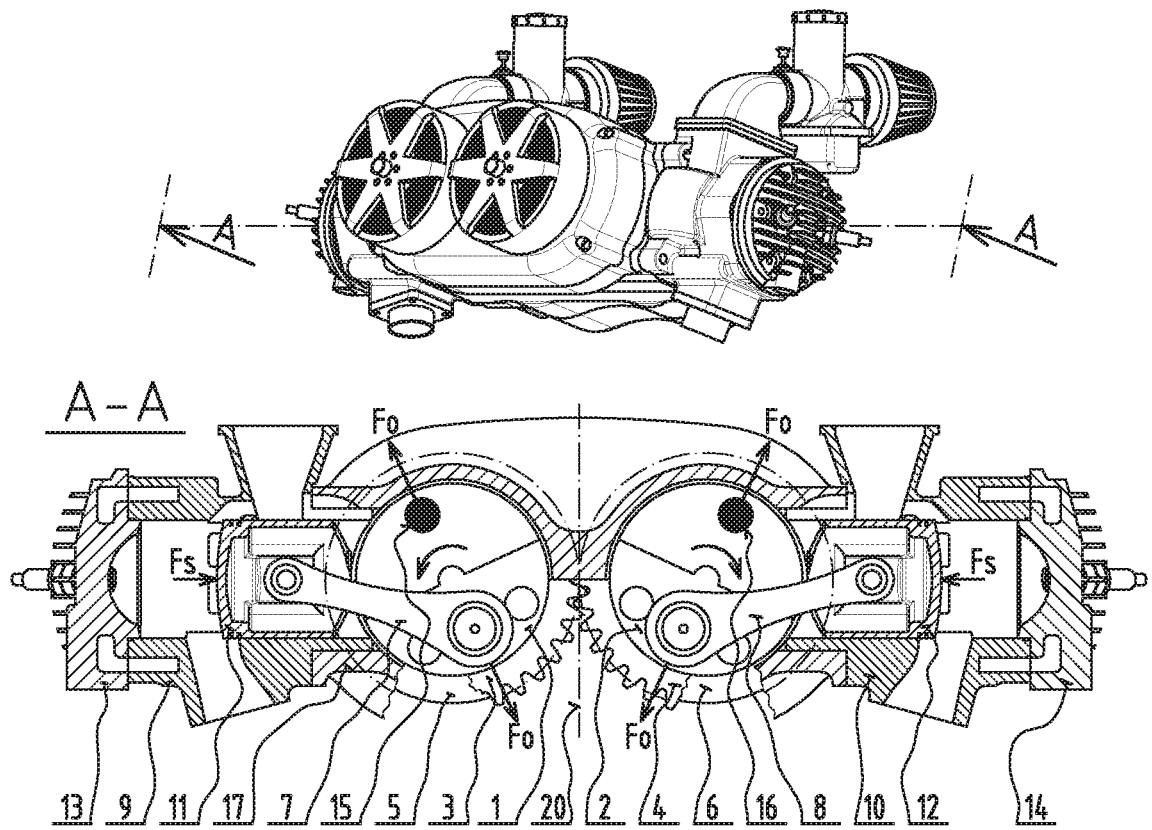
FIG. 1 is a cross-sectional view of a piston internal combustion engine with two cylinders with cylinder heads and pistons with connecting rods and two crankshafts connected by gears with a ratio of 1:−1, which means with the opposite direction of rotation. The first crankshaft with the gear is mounted parallel to the second crankshaft with the second gear in one engine case such that the 1:−1 gears are engaged. The first crankshaft is coupled to the first generator rotor and the second crankshaft is coupled to the second generator rotor. The cylinders with the pistons are positioned perpendicularly to the plane of symmetry between the crankshafts, and the axes of the pair of cylinders are lying in the plane. Both pistons are at the top dead center simultaneously. The engine has a two-stroke cycle.

The model piston internal combustion engine of FIG. 1 consists of the two cylinders 9 and 10 with the cylinder heads 13 and 14 and the pistons 11 and 12 with the connecting rods 7 and 8 and two crankshafts 1 and 2, which are connected by the gears 3 and 4 with 1:−1 ratio, which means with the opposite direction of rotation. The first crankshaft 1 with the gear 3 is mounted parallel to the second crankshaft 2 with the second gear 4 in one engine case 17 such that the gears are engaged. The first crankshaft 1 is coupled to the first generator rotor 5 and the second crankshaft 2 is coupled to the second generator rotor 6. The moment of inertia of the first crankshaft assembly 1 with the first gear 3 and the first generator rotor 5 corresponds to the moment of inertia of the second crankshaft assembly 2 with the second gear 4 and the second generator rotor 6. The cylinders 9 and 10 with the pistons 11 and 12 are positioned perpendicular to the plane of symmetry 20 between the crankshafts, with the axes of the pair of cylinders lying in the plane and both pistons 11 and 12 located in the top dead center simultaneously. The engine has a two-stroke cycle.

Figure 2:
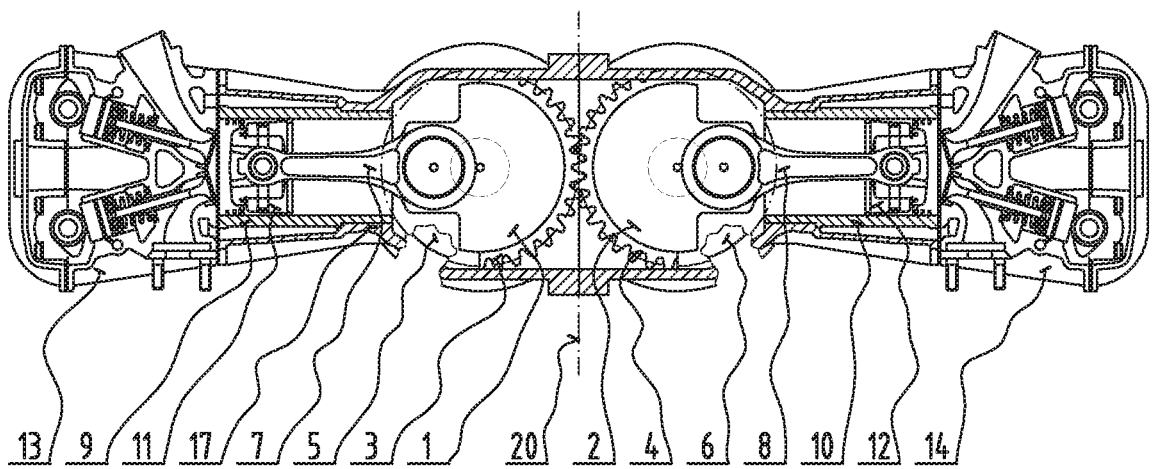
FIG. 2 is a cross-sectional view of a piston internal combustion engine having a generator similar to FIG. 1 but with a four-stroke cycle.

The model piston internal combustion engine with the generator of FIG. 2 is based on the embodiment of FIG. 1. However, the engine has a four-stroke cycle. The pistons 11 and 12 are located at the top dead center simultaneously and the ignitions occur in both cylinders at the time.

Figure 3:
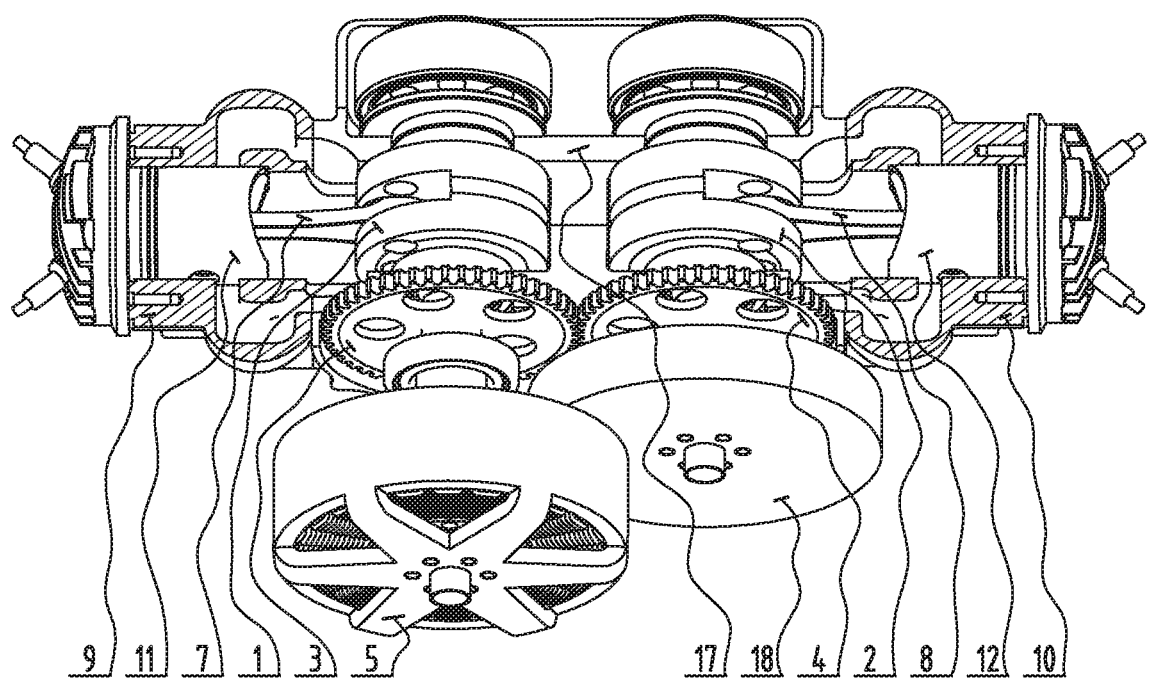
FIG. 3 is an axonometric view with partial cross-section of a piston internal combustion engine with a generator similar to that of FIG. 1. The difference is that the engine has only one generator rotor on one crankshaft and the other crankshaft has a flywheel. Due to the larger generator rotor and flywheel diameters than the distance between crankshafts, the generator rotor is axially displaced relative to the flywheel rotor.

The model piston internal combustion engine with the generator of FIG. 3 is based on the embodiment of FIG. 1. A larger first generator rotor 5 is mounted on the first crankshaft 1 and a flywheel 18 is mounted on the second crankshaft 2. To avoid colliding, they are axially offset.

Figure 4:
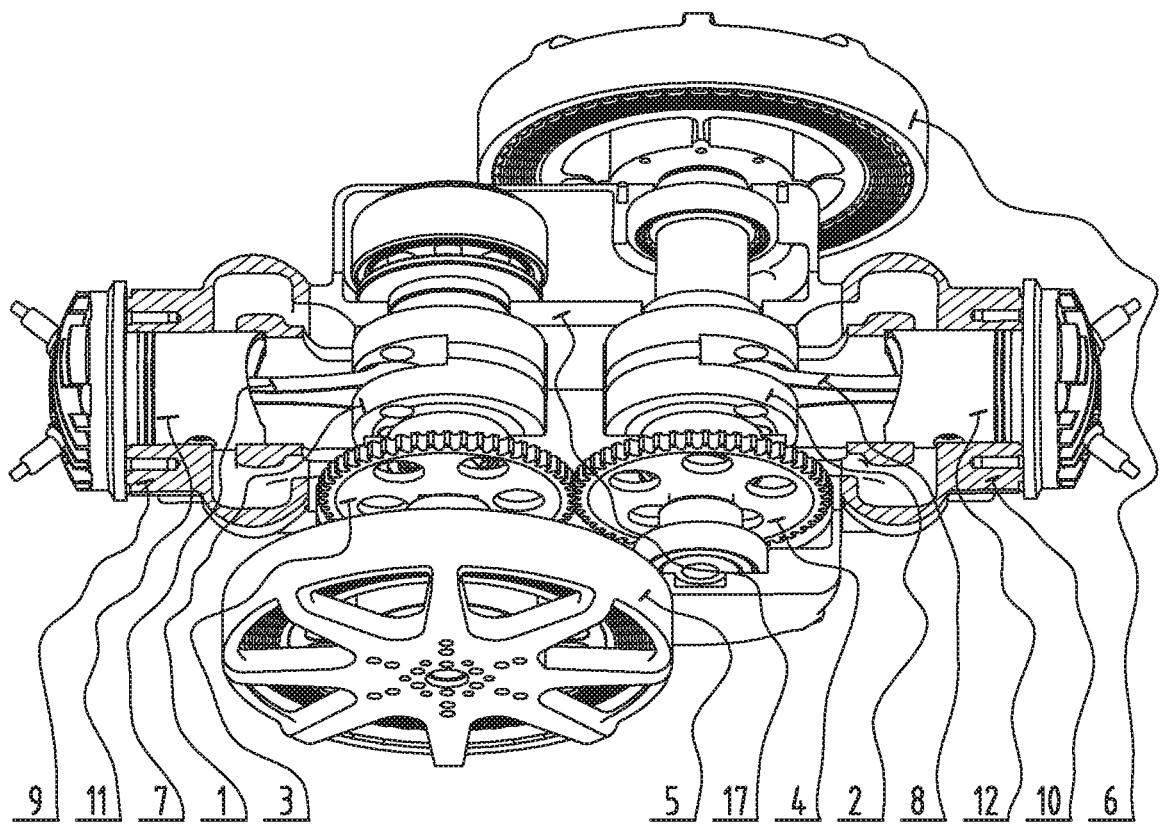
FIG. 4 is an axonometric view with partial cross-section of a piston internal combustion engine with a generator similar to that of FIG. 1. The difference is that one generator rotor is located at the front end of the first crankshaft and the other generator rotor is located at the rear end of the second crankshaft. The rotors have large external diameters, but they do not interfere with each other in this arrangement.

The model piston internal combustion engine with the generator of FIG. 4 is based on the embodiment of FIG. 1. The first generator rotor 5 is mounted on the front of the first crankshaft 1 and the second generator rotor 6 is mounted on the rear of the second crankshaft 2. The generator rotors 5 and 6 have large outer diameters, but they do not interfere with each other in this arrangement.

Figure 5:
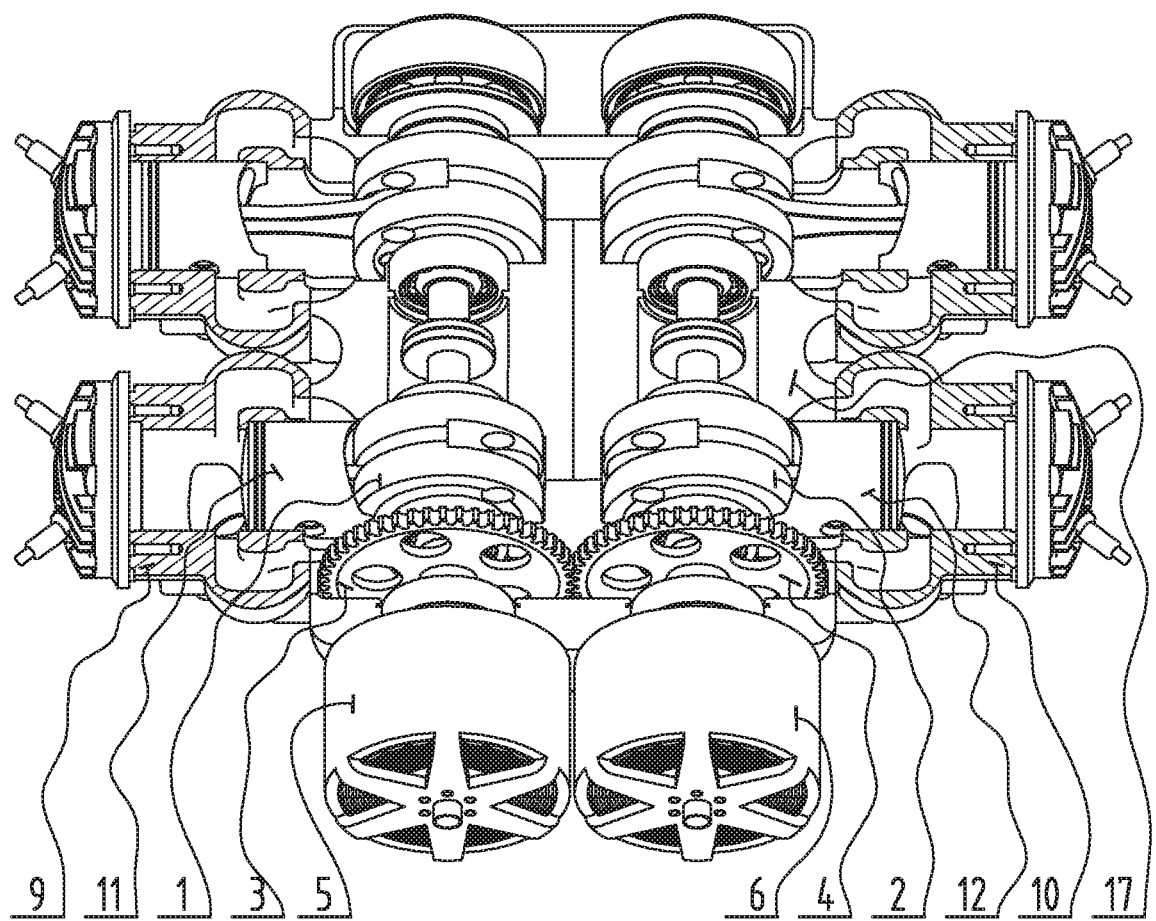
FIG. 5 is an axonometric view with partial cross-section of a piston internal combustion engine with a generator, with a two-stroke cycle and two pairs of opposed cylinders. The front pair of opposed cylinders has a working cycle shifted 180° from the rear pair of opposed cylinders. The crankshafts are fitted with the same generators on the front end.

The model piston internal combustion engine of the generator of FIG. 5 is based on the embodiment of FIG. 1. The engine differs in having two pairs of opposed cylinders 9 and 10. The front pair of opposed cylinders has a working cycle shifted 180° from the rear pair of opposed cylinders.

For the piston internal combustion engine with the generator, the operation is following. In the engine case 17, the first crankshaft 1 with the first gear 3 and the first generator rotor 5 rotates to the opposite side than the second crankshaft 2 with the second gear 4 and the second generator rotor 6 with the same speed due to the gears 3 and 4 with the gear ratio 1:1. The first piston 11 and the second piston 12 move symmetrically with respect to the plane of symmetry 20 of the engine, so that they are always at the top dead center simultaneously. Thus, the acceleration of the reciprocating masses of the first piston 11 is identical, but in the opposite direction to the acceleration of the reciprocating masses of the second piston 12, and at the same masses, the inertia forces Fs are completely eliminating each other. When replacing the connecting rod with two mass points, the additional inertia moment of the first connecting rod 7 and the second connecting rod 8 must also be considered. If the connecting rods are identical, these moments will also be identical but opposite and thus eliminated completely. Since the axes of the first cylinder 9 and the second cylinder 10 are in the same plane, no moment is generated from the inertia forces. The balancing of the rotating masses on the first crankshaft 1 as well as on the second crankshaft 2 is done in such a way that the unbalanced rotational masses are 100% balanced by balance weights 15 and 16 and the centrifugal forces FO thus also cancel each other. The ignition in the first cylinder 9 and the ignition in the second cylinder 10 transmit torque to the generator rotors 5 and 6. Since the crankshafts 1 and 2 are synchronized by the gears 3 and 4, their angular accelerations are exactly the same but opposite. Since the moment of inertia of the first crankshaft assembly 1 with the first gear 3 and the first generator rotor 5 is equal to the moment of inertia of the second crankshaft assembly 2 with the second gear 4 and the second generator rotor 6, the reaction moments has the same magnitude but opposite sense and so the resulting reaction to the engine block is completely eliminated. Thus, the piston internal combustion engine does not transmit any forces or moments except its weight to its mounts during operation. In a two-stroke engine, simultaneous ignition occurs in the first cylinder 9 and the second cylinder 10. Moreover, if the resistance of the rotors of the generators 5 and 6 is equal, the load between the first gear 3 and the second gear 4 is minimal. The function of the gears 3 and 4 will only be to synchronize. Only slight differences will be compensated due to the different course of combustion in the first cylinder 9 and the second cylinder 10.

In a four-stroke cycle engine, a common ignition in the first cylinder 9 and the second cylinder 10 or alternating ignition is possible when the working cycles are shifted 360°. In the case of alternating ignition, the operation of the generators 5 and 6 is smoother, but the gear loading of the gears 3 and 4 is significant, because the active crankshaft 1 must accelerate the second idle crankshaft 2 and vice versa.

In an embodiment of the engine, wherein the first generator rotor 5 is on the first crankshaft 1 and there is a flywheel 18 on the second crankshaft 2, the gears 3 and 4 will transmit power from the second crankshaft 2 to the crankshaft 1. In the case of common ignition in cylinders 9 and 10, however, the loading of the gears 3 and 4 is relatively favorable. The advantage may be the use of only one generator.

If the engine has several pairs of opposed cylinders 9 and 10, its operation is similar to that of a two-cylinder version. Working cycles of the different pairs of cylinders 9 and 10 can be phase shifted, and then the operation of the generator rotors 5 and 6 will be smoother and the power output will be higher.

INDUSTRIAL APPLICABILITY

The piston internal combustion engine of the present invention finds application as a range extender generator type for modern electric vehicles and aircrafts.

What is claimed is:

1. A reciprocating piston internal combustion engine with a generator comprising:
    an engine housing;
    at least two cylinders, each cylinder having a head and an axis;
    pistons with piston rods for each cylinder;
    gears having an opposite direction of rotation with a gear ratio of 1:−1; and
    two crankshafts connected by said gears, the two crankshafts being symmetrical to each other on either side of a plane of symmetry;
    a first generator having a rotor, and a second generator or a flywheel, the second generator having a rotor;
    wherein a first one of the two crankshafts with a first one of the gears is mounted parallel to a second one of the crankshafts with a second one of the gears in said engine housing;
    wherein the axis of a first of said at least two cylinders is identical to the axis of a second of said at least two cylinders, said crankshafts being mutually oriented so that said pistons are located at top dead center at the same time, and the axes of the first and second cylinders are perpendicular to the plane of symmetry between the first and second crankshafts;
    wherein the rotor of the first generator is fixedly mounted on the first crankshaft and the rotor of the second generator, or the flywheel, is fixedly mounted on the second crankshaft, such that the moment of inertia of the first crankshaft assembly with the first gear and the rotor of the first generator is operationally equivalent to the moment of inertia of the second crankshaft assembly with the second gear and the rotor of the second generator and/or the flywheel.

2. The reciprocating piston internal combustion engine of claim 1, further comprising:
    a plurality of balance weights associated with respective crankshafts balancing unbalanced rotating masses of the crankshafts, the plurality of balance weights canceling centrifugal forces when said crankshafts rotate about said axes; and
    wherein reciprocating masses of the crankshafts are free of weights on the first crankshaft and the second crankshaft.

3. The reciprocating piston internal combustion engine of claim 1, wherein the engine uses a two-stroke cycle.

4. The reciprocating piston internal combustion engine of claim 1, wherein the engine uses a four-stroke cycle.

5. The reciprocating piston internal combustion engine of claim 1, wherein the two cylinders are an opposed pair; and
    the pistons and piston rods are located symmetrically relative to said plane of symmetry between the two crankshafts for phase shifting working cycles of the opposed pair of cylinders.

6. The reciprocating piston internal combustion engine of claim 5, wherein a working cycle of the opposed pair is shifted by one revolution.

* * * * *